United States Patent [19]

Dörr et al.

[11] 4,163,047
[45] Jul. 31, 1979

[54] PROCESS FOR PRODUCING SULFURIC ACID FROM WASTE ACID AND IRON SULFATE

[75] Inventors: Karl-Heinz Dörr, Mainz; Georg Daradimos, Maintal; Hugo Grimm; Georg Schmidt, both of Frankfurt am Main; Rudolf Gerken, Krefeld-Traar; Christoph Mücke, Krefeld-Bockum; Hermann Wieschen, Cologne, all of Fed. Rep. of Germany

[73] Assignees: Metallgesellschaft Aktiengesellschaft, Frankfurt am Main; Bayer Aktiengesellschaft, Leverkusen, both of Fed. Rep. of Germany

[21] Appl. No.: 811,798

[22] Filed: Jun. 30, 1977

[30] Foreign Application Priority Data

Jul. 5, 1976 [DE] Fed. Rep. of Germany ....... 2630196

[51] Int. Cl.² ................... C01B 17/90; C01B 17/50; C01G 23/00; C01G 49/02
[52] U.S. Cl. ................................ 423/531; 423/83; 423/522; 423/540; 423/632; 423/154; 423/DIG. 2
[58] Field of Search .................. 423/531, 541, DIG. 2, 423/82, 83, 154, 558; 134/13

[56] References Cited

U.S. PATENT DOCUMENTS

| | | | |
|---|---|---|---|
| 2,098,056 | 11/1937 | McBerty | 423/83 |
| 2,184,419 | 12/1939 | Fowler et al. | 423/DIG. 2 |
| 2,185,095 | 12/1939 | Smith et al. | 134/13 |
| 2,202,414 | 5/1940 | Barnes et al. | 423/541 |
| 2,960,391 | 11/1960 | Sweet et al. | 423/DIG. 2 |

FOREIGN PATENT DOCUMENTS

957473 2/1957 Fed. Rep. of Germany .... 423/DIG. 2
483821 4/1938 United Kingdom .............. 423/DIG. 2

Primary Examiner—O. R. Vertiz
Assistant Examiner—Gary P. Straub
Attorney, Agent, or Firm—Sprung, Felfe, Horn, Lynch & Kramer

[57] ABSTRACT

A process for the recovery of sulfuric acid from waste sulfuric acid containing iron sulfate and from solid iron sulfate of high water content of crystallization which consists essentially of:

A. concentrating waste sulfuric acid to an acid concentration of 25–55 weight percent, based upon the suspension, by removing water therefrom;

B. mixing the concentrated acid of Step A with recycled concentrated sulfuric acid obtained from Step E to form a resultant acid mixture of acid concentration of 30–65 weight percent, based upon the suspension;

C. adding said solid iron sulfate of high water content of crystallization to the acid mixture of Step B thereby obtaining iron sulfate of low water content of crystallization;

D. separating the iron sulfate of low water content from the resultant sulfuric acid solution of Step C;

E. concentrating the separated sulfuric acid solution of Step D to an acid concentration of 45–70 weight percent, based on salt-free acid, and recycling at least a portion thereof to Step B; and F. thermally decomposing the iron sulfate from Step D to produce iron oxide and sulfur dioxide.

11 Claims, 1 Drawing Figure

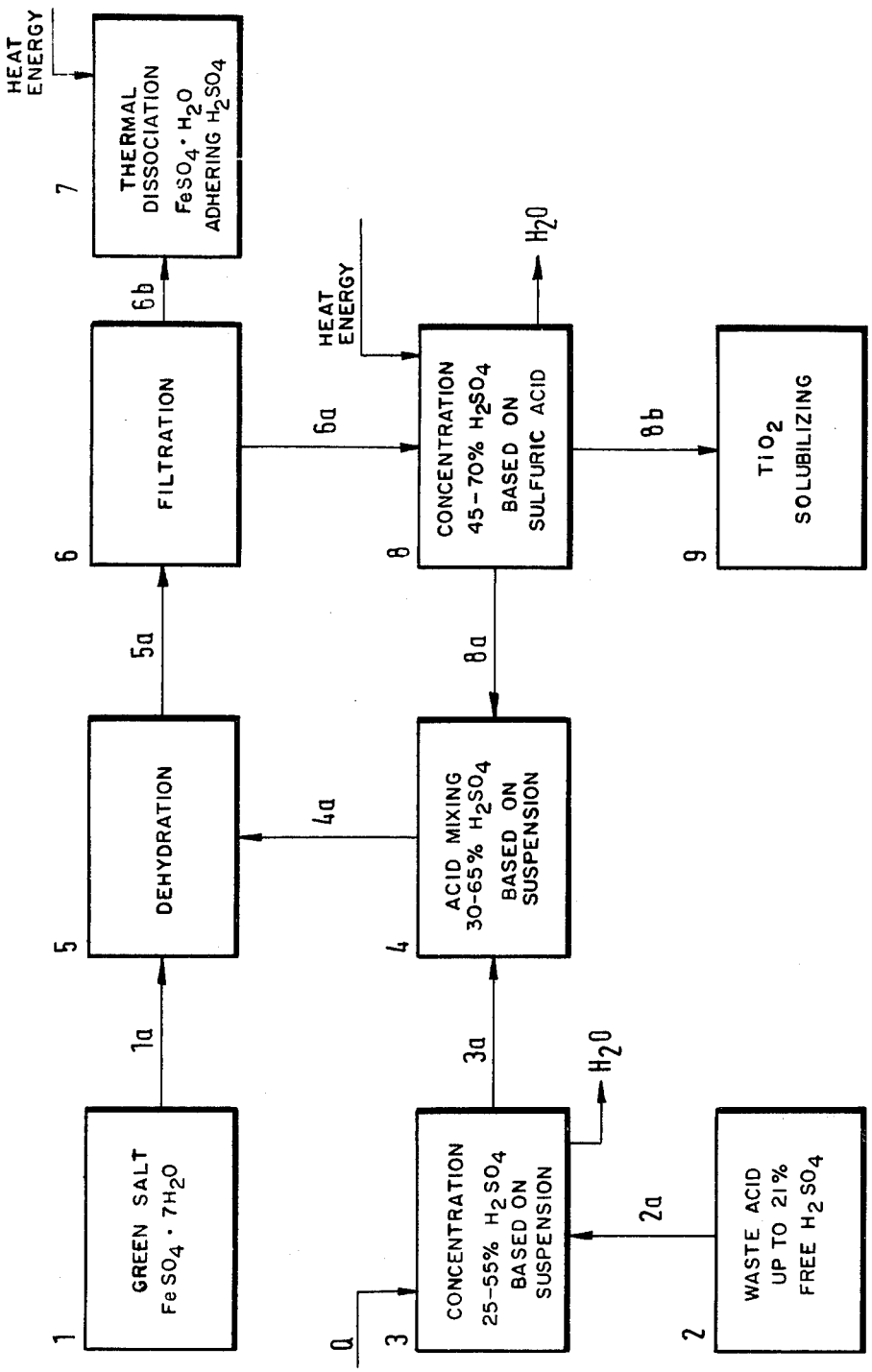

PROCESS FOR PRODUCING SULFURIC ACID FROM WASTE ACID AND IRON SULFATE

BACKGROUND OF THE INVENTION

1. Field of the Invention

This invention relates to an improved process for the production of sulfuric acid from waste sulfuric acid, especially waste sulfuric acid obtained as a result of solubilizing treatment of $TiO_2$-containing materials with sulfuric acid. This invention is especially concerned with the recovery of iron sulfate (ferrous sulfate) of low water content from ferrous sulfate of higher water content, e.g., green salt. This invention is particularly concerned with a process in which waste sulfuric acid is added to green salt having a high water content of crystallization, the ferrous sulfate is dehydrated and ferrous sulfate of low water content is filtered off to leave therebehind a diluted filtrate of waste sulfuric acid wherein a partial stream of said filtrate is recycled to the dehydration step together with waste sulfuric acid. The recovered iron sulfate is thermally decomposed and sulfuric acid is manufactured from the $SO_2$-containing gases.

2. Discussion of the Prior Art

The solubilizing treatment of $TiO_2$-containing raw materials with sulfuric acid results in waste products which consist of waste sulfuric acid and, during the treatment of ilmenite, of the so-called green salt. Waste acid contains up to about 21% by weight of free sulfuric acid and metal sulfates, mainly iron sulfate. The solid green salt consists of ferrous sulfate having a high content of water of crystallization and contains up to about 90% by weight $FeSO_4 \cdot 7H_2O$. A recovery of the raw materials is desirable for ecological reasons.

A direct processing of the green salt to effect a thermal dissociation into iron oxide and $SO_2$, which is processed to form sulfuric acid, is highly expensive because the dissociation must be effected at high temperatures and the high content of water of crystallization in the green salt must be heated to that temperature. Besides, the moisture must be removed from the released gases if they are to be subjected to dry catalysis.

Similar remarks are applicable to the processing of the waste acid by thermal dissociation because the sulfuric acid concentration is very low. For this reason the concentration of such waste acid is increased before they are dissociated.

It is known to conduct the waste acid which becomes available as a result of the solubilizing treatment of $TiO_2$-containing materials with sulfuric acid directly into the thickening zone of a crystallizer, in which concentrated sulfuric acid having a sulfuric acid concentration of 60–65% is added to increase the sulfuric acid concentration to 50–55%, and then to withdraw and filter off the ferrous sulfate, which has formed and settled and has a low content of water of crystallization, to treat the aqueous filtrate and the overflow effluent from the crystallizer, which contain 50–55% sulfuric acid, by means of an immersion burner in an evaporator to increase the sulfuric acid concentration to 60–65%, to conduct a partial stream of that acid of increased concentration into the crystallizer, and to increase the concentration of the other partial stream still further and then to re-use the latter partial stream for the solubilization of the $TiO_2$. The solid ferrous sulfate ($FeSO_4 \cdot H_2O$) which has been filtered off and has a low content of water of crystallization is then processed to form sulfuric acid (German Patent Specification No. 957,473). In that process, acid must be circulated at a very high rate in order that the mixing of the waste solid, which contains about 20% sulfuric acid, and of the more highly concentrated, circulated acid, which contains 60–65% sulfuric acid, results in mixed acids having a sulfuric acid concentration of 50–55%. Besides, solid green salt is not added to the process.

It is an object of the invention to enable an economical and ecologically satisfactory processing of the waste acid and of the solid ferrous sulfate, which has a high content of water of crystallization, which become available as a result of the solubilization of $TiO_2$.

SUMMARY OF THE INVENION

The foregoing object is provided, in accordance with this invention, by providing an improvement in a process for the production of sulfuric acid from waste sulfuric acid containing iron sulfate of high water content of crystallization which is a product of sulfuric acid treatment of $TiO_2$-containing raw materials wherein A. Iron sulfate of high water content of crystallization is dehydrated to solid iron sulfate of lower water content of crystallization by concentrating the sulfuric acid concentration of waste sulfuric acid containing iron sulfate of high water content of crystallization;

B. Solid iron sulfate of lower water content of crystallization from step A is separated from liquid;

C. The sulfuric acid concentration of the separated liquid from step B is increased by an evaporation of water;

D. At least a portion of the concentrated liquid of step C is recycled together with fresh waste sulfuric acid to step A; and E. Sulfuric acid is recovered from the solid iron sulfate of lower water content of crystallization of step B, the improvement which comprises:

1. Concentrating the waste sulfuric acid employed in step A by heat supply to a concentration of 25 to 55 weight percent based upon the suspension prior to introduction same into step A;

2. Concentrating said liquid in step C by heat supply to a concentration of 45 to 70 weight percent based on saltfree acid;

3. Adjusting the sulfuric acid overall concentration of the acid mixture of step D to 30 to 65% by weight based upon the suspension;

4. Admixing solid sulfate of high water content of crystallization which is a product of sulfuric acid treatment of $TiO_2$-containing raw materials to the mixture of step 3 and treating the mixture in step A; and 5. Thermally decomposing the solid iron sulfate of lower water content of crystallization with adhering sulfuric acid of step B and producing sulfuric acid from the $SO_2$-containing gas of the decomposition step.

In accordance with the present invention there is provided a process wherein the sulfuric acid concentration of the waste sulfuric acid employed is increased to 25 to 55 weight percent based upon the suspension to be produced. This waste sulfuric acid is combined with a portion of the recycle (filtrate) sulfuric acid also of increased concentration of 45 to 70% by weight based on saltfree acid to provide an overall sulfuric acid concentration of the acid mixture of 30 to 65% by weight, based upon the suspension. To the acid mixture is then added solid iron sulphate of high water content of crystallization. The resulting mixture is treated to transform the ferrous sulfate of high water content to ferrous sulfate of low water content of crystallization. The resultant suspension is filtered whereby to provide solid iron sulfate of low water content with adhering sulfuric acid which is decomposed in a thermal decomposition step. Sulfuric acid produced as a result of this thermal decomposition step, which evolves $SO_2$-containing gases, can be formed into sulfuric acid by known contact catalyst processes. The thus produced sulfuric acid can be used for the acid treatment of $TiO_2$-containing raw materials or for other purposes.

The heat required to increase the concentration may be supplied by a direct and/or indirect transmission of heat. Low-grade heat, which becomes available at low temperatures, may be used on a large scale. The waste acid of increased concentration and aqueous filtrate of increased concentration are suitably mixed in the stage in which ferrous sulfate having a high content of water of crystallization is transformed to ferrous sulfate having a low content of water of crystallization. The solid ferrous sulfate having a high content of water of crystallization is suitably fed directly to that transforming stage. The remainder of the filtrate of increased concentration is suitably used entirely or in part to solubilize the $TiO_2$. Alternatively, the remainder may be used entirely or in part for other purposes, such as the production of fertilizer or for other ore-leaching processes. The temperature must be selected so that previously formed ferrous sulfate having a low content of water of crystallization is not transformed back to ferrous sulfate having a high content of water of crystallization in the process, particularly during the filtration. The minimum temperature is 10°–50° C., depending on the concentration of sulfuric acid.

According to a preferred feature, at least part of the remainder of the filtrate of increased concentration is passed through the thermal dissociating stage before it is used to solubilize the $TiO_2$. As a result, the concentration of the acid is increased, as is required in the process, in such a manner that the dissociating stage is relieved.

According to a preferred feature, the sulfuric acid concentration of the remainder of the filtrate which has been increased in concentration is increased by an indirect supply of heat. This enables a further increase of the concentration of the acid whereas a difficulty due to exhaust air does not arise.

According to a preferred feature, the ratio of waste acid to solid ferrous sulfate having a high content of water of crystallization is 0.5 to 0.9, preferably 0.7. With a ratio in this range, part of the waste products of a $TiO_2$-recovering plant supplied with ilmenite can be processed in accordance with the invention with an allowance for the quantity of sulfuric acid which adheres to the filter cake consisting of ferrous sulfate having a low content of water of crystallization.

According to a preferred feature, the ratio of waste acid to solid ferrous sulfate having a high content of water of crystallization is 1.5 to 2.5. With a ratio in that range, all of the waste products of a $TiO_2$-recovering plant supplied with ilmenite can be processed in accordance with the invention.

According to a preferred feature, the ratio of acid mixture to solid ferrous sulfate having a high content of water of crystallization is at least 1 and preferably 2 to 3. A ratio in that range results also in desirable conditions with respect to the sulfuric acid adhering to the solid ferrous sulfate which has been filtered off and has a low content of water of crystallization as well as to the dissociation of said sulfuric acid and the salt content of the aqueous filtrate.

According to a preferred feature the addition of solid iron sulfate of high water content of crystallization to waste sulfuric acid is performed such that following filtration of solid ferrous sulfate the solid ferrous sulfate material contains sulfuric acid adhering thereon which has a concentration of 30 to 60 weight percent.

This invention will be explained more fully with reference to Examples and to a flow scheme. For the sake of clearness, a separate acid-mixing stage is shown for the mixing of the acid. The solid ferrous sulfate having a high content of water of crystallization will be describes as "green salt". The transformation of ferrous sulfate having a high content of water of crystallization into ferrous sulfate having a low content of water of crystallization will be described as "dehydration".

BRIEF DESCRIPTION OF DRAWING

Referring to the drawing herewith, the same is a flow diagram illustrating a preferred mode for carrying out the process.

DESCRIPTION OF SPECIFIC EMBODIMENTS

Referring to the drawing herewith, waste acid from holding tank 2 is fed via line 2a to a concentrator 3 wherein water is removed. The concentrated waste sulfuric acid is removed from the concentrator via line 3a to an acid mixing tank 4.

Iron sulfate or "green salt" is removed from the holding vessel 1 and passed through line 1a to a dehydration zone 5 into which is passed an acid mixture from tank 4 via line 4a. This acid mixture comprises concentrated waste acid from vessel 3 as well as concentrated liquid filtrate acid from vessel 8.

In dehydration zone 5, the iron sulfate of higher water content is converted to iron sulfate of lower water content by virtue of the acid treatment. The mixture is passed to a filtration zone 6 via line 5a. In filtration zone 6, the ferrous sulfate of lower water content is separated off and passed via line 6b to a thermal dissociation stage 7. Liquid filtrate comprising sulfuric acid is removed from the filtration zone 6 via line 6a and introduced into a concentrator 8 wherein water is removed to provide a more concentrated sulfuric acid containing filtrate. A portion of this more concentrated acid is introduced via line 8a to the acid mixing vessel 4, while another portion is withdrawn via line 8b where it can be employed anew in a $TiO_2$ solubilizing stage (9).

In order to more fully illustrate the nature of the invention and the manner of practicing the same, the following examples are presented:

EXAMPLE 1

As a result of the solubilizing treatment of Norwegian ilmenite with sulfuric acid, 4 tons of green salt and 8 tons of waste sulfuric acid become available per ton of $TiO_2$.

The green salt contains 90% by weight of $FeSO_4.7H_2O$ and 5% by weight adhering moisture, balance metal sulfate hydrates. The waste sulfuric acid has approximately the following chemical composition in % by weight:
$MeSO_4$: 15
$H_2SO_4$: 21
$H_2O$: 64

At a rate of 8000 kg/h, the waste sulfuric acid is fed from supply tank 2 through conduit 2a to the strengthening stage 3, in which heat is supplied to the waste sulfuric acid to increase its concentration to 30.4% by weight $H_2SO_4$, based on the suspension. At a rate of 5520 kg/h, the suspension is fed through conduit 3a to an acid-mixing stage 4. At a rate of 4480 kg/h, additional waste acid containing 65% by weight $H_2SO_4$ is fed from a strengthening stage 8 to the acid-mixing stage. As a result, sulfuric acid having a concentration of 45.9% by weight is fed at a rate of 10,000 kg/h from the acid-mixing stage through conduit 41a to the dehydrating stage 5, which is also fed from a dump 1 through conduit 1a with green salt at a rate of 4000 kg/h. The dehydrating stage 5 is thus fed at a total rate of 14,000 kg/h and contains acid mixture and green salt in a ratio of 2.5:1. The resulting suspension has a sulfuric acid concentration of 32.8% by weight, based on the suspension, and contains about 230 g $MeSO_4$ per kg.

The suspension is filtered in a filtering stage 6. The resulting filter cake becoming available at a rate of 5200 kg/h contains $MeSO_4.H_2O$ as well as 30% by weight adhering sulfuric acid having an $H_2SO_4$ concentration of 44.3% and is fed to a dissociating stage 7.

The filtrate which becomes available at a rate of about 8800 kg/h is strengthened in the strengthening stage 8 from 44.3 to 65% by weight $H_2SO_4$ by a supply of heat.

Of the total rate of about 6000 kg/h, part of the filtrate, at a rate of 4480 kg/h, is fed through conduit 8a to the acid-mixing stage. The remainder, amounting to about 1520 kg/h and containing sulfuric acid at a rate of about 990 kg/h, may be used to solubilize the $TiO_2$. This rate corresponds to about 50% of the sulfuric acid content of the free sulfuric acid which is contained in the waste sulfuric acid.

The temperature in the filtering stage amounted to 40°–50° C.

EXAMPLE 2

The waste sulfuric acid and the green salt had the same compositions and were used at the same rates as in Example 1.

In the strengthening stage 3, the waste sulfuric acid was strengthened to 30.4% by weight of sulfuric acid. The suspension which became available at 5520 kg/h was mixed in the acid-mixing stage 4 with acid of 65% concentration supplied from 8 at a rate of 480 kg/h. The resulting suspension becoming available at a rate of 6000 kg/h and having a sulfuric acid concentration of 33.1% by weight is fed to the dehydrating stage together with the green salt from 1. The resulting suspension at a rate of 10,000 kg/h had a sulfuric acid concentration of 19.9% by weight and contained 324 g metal sulfate per kg of the suspension. The ratio of acid mixture to green salt was 1.5:1.

When this suspension was filtered in 6, metal sulfate monohydrate and adhering sulfuric acid became available at a rate of about 5200 kg/h and were thermally dissociated. The filtrate became available at a rate of about 4800 kg/h and had a sulfuric acid concentration of 31.3% by weight and was strengthened in 8 to a concentration of 65% by weight. Of the resulting waste sulfuric acid which became available at a rate of about 2300 kg/h, a partial stream, at a rate of 480 kg/h, was fed to the acid-mixing stage and the remainder, having also a concentration of 65% by weight $H_2SO_4$, can be fed at a rate of about 1820 kg/h directly to the $TiO_2$-solubilizing stage. In this arrangement, about 70% of the free sulfuric acid contained in the waste acid can be directly recovered.

The temperature in the filtering stage amounted to 60°–70° C.

EXAMPLE 3

The waste sulfuric acid and the green salt had the same compositions and were used at the same rates as in Example 1.

In stage 3, the waste sulfuric acid was strengthened to 40.8% by weight $H_2SO_4$, based on the suspension, by a supply of heat. The resulting suspension which became available at a rate of 4120 kg/h was fed to the acid-mixing stage 4, which was also fed from 8 with 65% waste sulfuric acid at a rate of 5680 kg/h so that a suspension became available at a total rate of 10,000 kg/h. This suspension from 4 and the green salt from 1 were fed to the dehydrating stage 5, where a suspension containing 39.4% by weight of $H_2SO_4$ and 230 g $MeSO_4$ per kg became available at a total rate of 14,000 kg/h.

As a result of the filtration in 6, a filter cake consisting of $MeSO_4.H_2O$ and about 30% by weight adhering sulfuring acid became available at a rate of 5200 kg/h and was thermally dissociated at this rate.

The filtrate containing 53% by weight $H_2SO_4$ became available at a rate of about 8800 kg/h and was strengthened to 65% by weight $H_2SO_4$ in the strengthening stage 8 by a supply of heat. Part of the resulting waste acid, at a rate of 5880 kg/h, was fed to the acid-mixing plant. The remainder, at a rate of 1300 kg/h, was directly fed to the $TiO_2$-solubilizing stage. The rate of the directly used sulfuric acid amounted to about 840 kg/h and corresponds to about 50% of the free sulfuric acid content of the waste sulfuric acid.

The temperature in the filtering stage was 30° to 40° C.

EXAMPLE 4

In this arrangement, about 40% of the waste sulfuric acid which became available as a result of the $TiO_2$-solubilizing treatment, corresponding to a rate of 3300 kg/h, were processed. This rate corresponds to the rate at which sulfuric acid is lost due to the adhesion to metal sulfate monohydrates after the filtration. The rate of green salt, amounting to 4000 kg/h, and the composition are the same as in Example 1.

The waste sulfuric acid is first strengthened in 3 to 30.4% by weight $H_2SO_4$, based on the suspension. The resulting suspension which became available at a rate of 2280 kg/h is mixed in stage 4 with 65% waste sulfuric acid, which is fed from stage 8 at a rate of 7720 kg/h. As a result, a suspension having an $H_2SO_4$ concentration of 57.2% by weight became available at a rate of 10,000 kg/h and was used to dehydrate green salt at a rate of 4000 kg/h.

The resulting suspension which became available at a rate of 14,000 kg/h contained 40.8% by weight $H_2SO_4$ and 180 g metal sulfate per kg and was filtered in stage 6. A filter cake containing 30% by weight adhering sulfuric acid became available at a rate of 4100 kg/h and was fed to the dissociating stage 7. The filtrate which became available was strengthened to 65% by weight $H_2SO_4$ and at the total rate of 7720 kg/h was fed to the acid-mixing stage 4.

The temperature in the filtering stage was 40°–50° C.

The advantages of the invention reside mainly in that the salt-containing waste acid and the iron sulfate having a high content of water of crystallization which become available can be processed with a relatively low expenditure and in an ecologically satisfactory manner in a process in which waste products are not obtained at all in some cases whereas the resulting raw materials can be used entirely in the same process or partly in other processes so that waste products are not obtained. Even when part of the strengthened filtrate must be discarded because it cannot be used, a large part of the waste materials are processed and reused in an ecologically satisfactory manner.

What is claimed is:

1. A process for the recovery of sulfuric acid from waste sulfuric acid containing iron sulfate and from solid iron sulfate of high water content of crystallization which consists essentially of:
   A. concentrating waste sulfuric acid to an acid concentration of 25–55 weight percent, based upon the suspension, by removing water therefrom;
   B. mixing the concentrated acid of Step A with recycled concentrated sulfuric acid obtained from Step E to form a resultant acid mixture of acid concentration of 30–65 weight percent, based upon the suspension;
   C. adding said solid iron sulfate of high water content of crystallization to the acid mixture of Step B thereby obtaining iron sulfate of low water content of crystallization;
   D. separating the iron sulfate of low water content from the resultant sulfuric acid solution of Step C;
   E. concentrating the separated sulfuric acid solution of Step D to an acid concentration of 45–70 weight percent, based on salt-free acid, and recycling at least a portion thereof to Step B; and
   F. thermally decomposing the iron sulfate from Step D to produce iron oxide and sulfur dioxide.

2. A process according to claim 1 wherein at least a portion of the concentrated sulfuric acid solution produced in step E having a concentration of 45–70 weight percent and which is not recycled according to step E is passed additionally through a thermal decomposition stage according to step F and the sulfuric acid produced from the entire $SO_2$-containing gas is employed to solubilize $TiO_2$.

3. A process according to claim 1 wherein the sulfuric acid concentration of the concentrated sulfuric acid solution produced in step E having a concentration of 45–70 percent by weight and which is not recycled according to step E is increased by indirectly applying heat thereto sufficient to evaporate water.

4. A process according to claim 1 wherein the weight ratio of waste sulfuric acid introduced into step A to solid iron sulfate of high water content of crystallization introduced into step C is 0.05 to 0.09, the ratio being based upon the weight of fresh waste acid before concentration and the weight of solid ferrous sulfate before being admixed with said acid.

5. A process according to step 4 wherein the weight ratio of waste sulfuric acid introduced into step A to solid iron sulfate of high water content of crystallization introduced into step C is 0.7, the ratio being based on the weight of fresh waste acid before concentration and the weight of said solid iron sulfate before being admixed with said acid.

6. A process according to claim 1 wherein the weight ratio of waste acid introduced in step A to solid iron sulfate having a high water content of crystallization introduced in step C is 1.5 to 2.5, the ratio being based upon the weight of fresh waste acid before concentration and the weight of said solid iron sulfate before being admixed with said acid.

7. A process according to claim 1 wherein in step C the weight ratio of introduced acid mixture produced in step B and introduced solid iron sulfate having a high content of water of crystallization is at least 1, the ratio being based upon the weight of fresh waste acid before concentration and the weight of said solid iron sulfate before being admixed with said acid.

8. A process according to claim 1 wherein in step C the weight ratio of introduced acid mixture produced in step B and introduced solid iron sulfate having a high content of water of crystallization is 2 to 3, the ratio being based upon the weight of fresh waste acid before the concentration and the weight of said solid iron sulfate before being admixed with said acid.

9. A process according to claim 1 wherein the addition of solid iron sulfate of high water content of crystallization according to step C is performed in such an amount that the sulfuric acid which remains adhering to the iron sulfate of low water content separated in accordance with step D has a concentration of 30–60 percent by weight.

10. A process according to claim 1 wherein the sulfur dioxide of Step F is processed to obtain sulfuric acid.

11. A process according to claim 1 wherein the waste sulfuric acid of step A and iron sulfate of step B are ones which have been obtained by sulfuric acid treatment of $TiO_2$-containing materials.

* * * * *